United States Patent
Bang-Olsen et al.

(10) Patent No.: US 9,609,061 B2
(45) Date of Patent: Mar. 28, 2017

(54) RUGGED AND MOBILE MEDIA SERVER AND METHOD FOR PROVIDING MEDIA TO PASSENGERS ON A PUBLIC TRANSPORT VEHICLE

(71) Applicant: Trolex Aporta ApS, Skodsborg (DK)

(72) Inventors: Jesper Bang-Olsen, Skodsborg (DK); Simon Munch-Andersen, Frederiksberg (DK)

(73) Assignee: Trolex Aport ApS, Copenhagen K (DK)

( * ) Notice: Subject to any disclaimer, the term of this patent is extended or adjusted under 35 U.S.C. 154(b) by 0 days.

(21) Appl. No.: 14/205,223

(22) Filed: Mar. 11, 2014

(65) Prior Publication Data
US 2014/0337469 A1 Nov. 13, 2014

(30) Foreign Application Priority Data
Mar. 13, 2013 (DK) .................................. 2013 00143

(51) Int. Cl.
| | | |
|---|---|---|
| H04L 29/08 | (2006.01) |
| H04W 4/00 | (2009.01) |
| G06F 1/16 | (2006.01) |
| H04W 48/14 | (2009.01) |
| H04N 21/214 | (2011.01) |
| H04N 21/414 | (2011.01) |
| H04N 21/4363 | (2011.01) |
| H04N 21/61 | (2011.01) |
| H04W 84/12 | (2009.01) |
| H04W 88/08 | (2009.01) |

(52) U.S. Cl.
CPC .......... *H04L 67/12* (2013.01); *G06F 1/1628* (2013.01); *H04N 21/2146* (2013.01); *H04N 21/41422* (2013.01); *H04N 21/43637* (2013.01); *H04N 21/6125* (2013.01); *H04W 4/00* (2013.01); *H04W 48/14* (2013.01); *H04W 84/12* (2013.01); *H04W 88/08* (2013.01)

(58) Field of Classification Search
CPC ....................................................... G06F 1/16
See application file for complete search history.

(56) References Cited

U.S. PATENT DOCUMENTS

| 6,003,068 | A | * | 12/1999 | Sopko ........................... 709/205 |
| 2001/0036822 | A1 | * | 11/2001 | Mead .................. G06Q 10/107 |
| | | | | 455/414.3 |

(Continued)

FOREIGN PATENT DOCUMENTS

DE 102009003554 A1 9/2010

OTHER PUBLICATIONS

<http://web.archive.org/web/20130802093245/http://www.cypress.bc.ca/portable_wifi_access_point.html> Jan. 6, 2012.

(Continued)

*Primary Examiner* — Natisha Cox
(74) *Attorney, Agent, or Firm* — Ziegler IP Law Group, LLC

(57) ABSTRACT

A rugged and mobile media server/portal for use on a public transport vehicle, such as a train to provide media content to passengers on board said vehicle. The rugged and mobile media server/portal includes a mobile and protective case that contains a computer with a media library stored thereon and a local wireless network access point for providing a local wireless network on board the vehicle.

12 Claims, 14 Drawing Sheets

(56) References Cited

U.S. PATENT DOCUMENTS

| | | | |
|---|---|---|---|
| 2002/0152285 A1* | 10/2002 | Wheeler | H04L 12/413 709/218 |
| 2003/0157959 A1* | 8/2003 | Makela | H04W 4/00 455/556.1 |
| 2004/0184466 A1* | 9/2004 | Chang | H04W 92/02 370/401 |
| 2004/0205123 A1* | 10/2004 | Terasawa | G06F 1/1626 709/203 |
| 2005/0037787 A1* | 2/2005 | Bachner et al. | 455/502 |
| 2006/0107295 A1* | 5/2006 | Margis | H04N 7/163 725/81 |
| 2007/0136446 A1* | 6/2007 | Rezvani | G06F 17/30749 709/219 |
| 2008/0155098 A1* | 6/2008 | Arena | 709/225 |
| 2008/0253581 A1* | 10/2008 | Jalics | H04H 20/61 381/79 |
| 2009/0075624 A1* | 3/2009 | Cox et al. | 455/345 |
| 2009/0081947 A1* | 3/2009 | Margis | H04B 7/18508 455/3.02 |
| 2009/0100476 A1* | 4/2009 | Frisco | H04B 7/18508 725/68 |
| 2009/0119721 A1* | 5/2009 | Perlman | H04N 7/24 725/76 |
| 2010/0011054 A1 | 1/2010 | Pan | |
| 2010/0189089 A1* | 7/2010 | Lynch | H04W 84/005 370/338 |
| 2012/0078726 A1* | 3/2012 | Black | G06Q 30/0251 705/14.66 |

OTHER PUBLICATIONS

<http://web.archive.org/web/20130117060213/http://www.pelican.com/cases_detail.php?Case=1450> Jan. 17, 2013.

* cited by examiner

RUGGED AND MOBILE MEDIA SERVER AND METHOD FOR PROVIDING MEDIA TO PASSENGERS ON A PUBLIC TRANSPORT VEHICLE

CROSS-REFERENCE TO RELATED APPLICATIONS

This application claims priority to and the benefit of Danish patent application no. PA 2013 00143, filed 13 Mar. 2013, now Danish Patent No. DK 177618 B1, issued 9 Dec. 2013, the disclosure of which is incorporated by reference in its entirety.

BACKGROUND

1. Field

The present application relates to a rugged and mobile media server for use in public transportation.

2. Brief Description of Related Developments

Public transport vehicles, such as buses, trains or airplanes are increasingly being provided with display screens for each passenger. Installing and wiring a large number of display screens, so that each passenger has its own display screen and can select its own content is a major operation. Such an installation requires a major development project phase, involves the approval by authorities for security and safety aspects and the actual installation and material expenses are very high, i.e. all in all this is a very costly affair.

DE 102009003554 discloses a server installed on a passenger bus. Some parts of the server system, like the server computer, mobile data modems and switch are located in a removable and transportable housing. Other Parts of the server system are fixed installation on the passenger bus, such as the wireless access point and the cabling of the server system. This known server is not self-contained and does not provide a carry-on portable solution for providing media to passengers of a transport vehicle that works immediately without require any setup or installation.

SUMMARY

On this background, it is an object of the present invention to provide individual media content to passengers of a public transport vehicle which solves or at least reduces the problems associated with the known solutions.

This object is achieved by providing a rugged, portable and self-contained media server for use in a public transportation vehicle, the media server comprising a carry-on, portable, rugged, protective and mobile case that forms a housing with an interior space, the interior space containing a computer with a memory having a library of digital media stored thereon, a wireless network access point connected to the computer and a mobile data network modem connected to the computer or to the wireless network access point, the wireless access point being configured to establish a local wireless network on board the public transportation vehicle, the computer comprising a processor configured to automatically update the content of the library of digital media when the mobile phone- or mobile data network modem has connection to a mobile phone- or mobile data network, and the processor is further configured for providing a media service for offering passengers on board the public transportation vehicle access to media stored in the library via the wireless network.

By providing a media server in a carry-on, rugged portable and self-contained case with a media library that is automatically updated when possible, it becomes possible for staff of the public transport vehicle to simply carry the media server on board and to stow it on board the vehicle and thereby provide individual media content to passengers of a public transport vehicle that use their own terminal device to play the media content provided by the media server.

In an embodiment the rugged and mobile media server is a self-contained unit without any physical user interface components.

In an embodiment the rugged and mobile media server is a self-contained unit with a power cord with a power plug for connection to a wall socket or similar power source of the public transportation vehicle as the only physical interface with its surroundings.

In an embodiment the wireless access point is configured for coverage of the public transportation vehicle such as a bus, a train or an airplane, possibly supported by independent range extender wireless network units when the rugged and mobile media server is used in very long vehicles.

In an embodiment the processor is configured to automatically start up the media service when the computer is powered up.

In an embodiment the processor is configured for allowing any terminal device with a suitable wireless network communication functionality that is on board the public transport vehicle to access media stored in the library.

In an embodiment the computer has a passive cooling system including a cooling area of an outside wall of the computer and wherein the cooling area is a part of an outer wall of the protective and mobile case, preferably so that the outer surface of the cooling area is substantially flush with the outer wall of the protective mobile case.

In an embodiment the protective mobile case is provided with wheels and a preferably extendable handle and can be transported with one hand by a single operator.

In an embodiment the protective mobile case can be opened and closed and is provided with at least one lock for preventing unauthorized persons from opening the protective mobile case. In an embodiment the protective mobile case is provided with a lock or attachment arrangement for securing the protective mobile case to the structure of the public transportation vehicle.

In an embodiment the protective mobile case is not provided with any physical user interface.

In an embodiment the protective mobile case is provided with a power cord for connection to a power socket and wherein the power cord is connected to a power supply module in the case or to a power supply module in the computer and/or in the wireless access point. In an embodiment the protective and mobile case is provided with a fan that is commenced to a ventilation opening in an outer wall of the case.

In an embodiment the processor is configured to attempt to- and update any software installed on the computer and any media content for the library whenever the mobile phone- or mobile data network modem is connected to a mobile phone- or mobile data network. In an embodiment the protective mobile case further includes a GPS receiver connected to the computer and a GPS antenna integrated in the protective mobile case and connected to the GPS receiver.

In an embodiment the rugged and mobile media server includes one or more independent range extenders, each extender being housed in a separate protective and mobile range extender case. In an embodiment the range extender case and the mobile protective case are configured to be attachable to one another so as to allow a single operator to transport the combination of a protective mobile case and a range extender case with one hand. In an embodiment the extender casing further comprises an uninterruptible power supply connected to the computer and the wireless network access point. In an embodiment the rugged media server further includes using a fully integrated DRM system.

The object above is also achieved providing by a method for providing media to passengers on a public transport vehicle that carry personal wireless network enabled media playing capable terminal devices, the method comprising carrying a carry-on, rugged, portable and self-contained media server on board the public transport vehicle, the carry-on, rugged and portable media server comprising a carry-on, rugged protective and portable mobile case that contains a computer with a memory having a library of digital media stored thereon, a wireless network access point connected to the computer and a mobile data network modem connected to the computer or to the wireless network access point, the wireless access point being configured to establish a local wireless network on board the public transportation vehicle, automatically updating the content of the library of digital media when the mobile phone- or mobile data network modem has connection to a mobile phone- or mobile data network, and setting up a local wireless network that covers the public transport vehicle from the wireless network access point, allowing the passengers access media in the media library via the wireless network, allowing the passengers to select media for streaming or downloading to their personal wireless network enabled media playing capable terminal device, and streaming or downloading media content selected by the passenger to the passenger's wireless network enabled media playing capable terminal device via the local wireless network.

In an embodiment the media library comprises movies and/or music and/or audiobooks and/or games. In an embodiment the media library content is fully stored on the portal server. In an embodiment the method further includes offering both content that is free and content which is subject to a fee. In an embodiment the method further includes offering content that can be played as streaming on demand, download-to-own or as part of a subscription package. In an embodiment the method further includes offering travel information via the portal, such as allowing a passenger to be able to call up: information concerning the punctuality and connections of his/her current public transport vehicle, stations or stopover maps, detailed description on the services in the public transport vehicle. In an embodiment the method further includes automatically updating software and/or library when the mobile phone- or mobile data network modem has connection to a mobile phone- or mobile data network.

In an embodiment the user interface for selection of media content is a browser or webportal or a native app running on the passenger's wireless network enabled media playing capable terminal device. In an embodiment the portal contains a welcome page with an explanation of the portal and its operation. In an embodiment the media library comprises movies and/or music and/or audiobooks and/or games. In an embodiment the media library content is fully stored on the portal server.

Further objects, features, advantages and properties of the media server and method according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which:

FIG. 9 is an elevated view of the interior of the range extender according to FIGS. 8a, 8b and 9;

DETAILED DESCRIPTION OF PREFERRED EMBODIMENTS

In the following, example embodiments of the media server for providing media content to passengers of a public transport vehicle and method of providing media content to passengers of a public transport vehicle, will be described in detail and with reference to the attached drawings.

Figure 1:
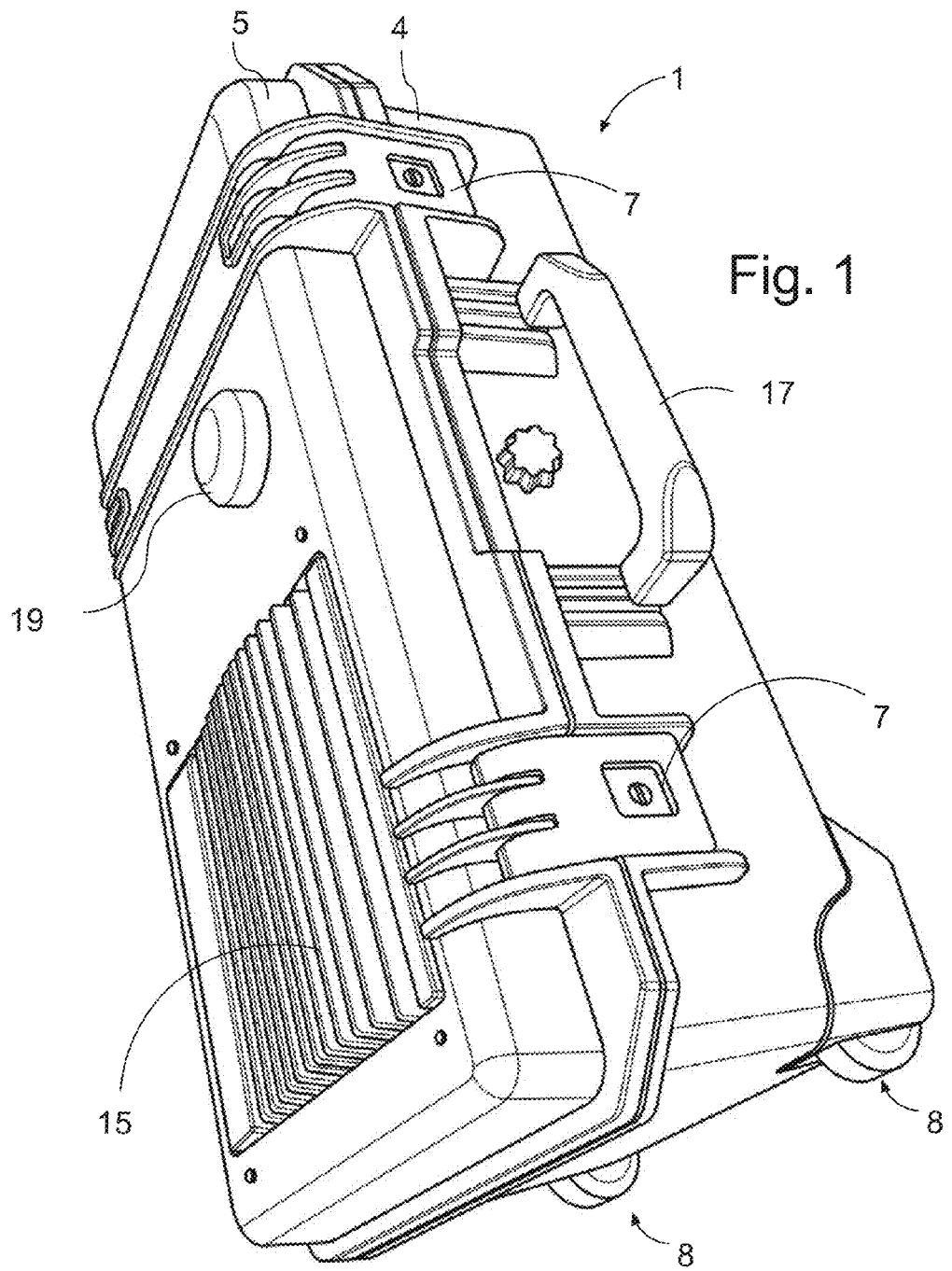
FIG. 1 is an elevated view of a rugged case containing a mobile media server according to an example embodiment.
Figure 2:
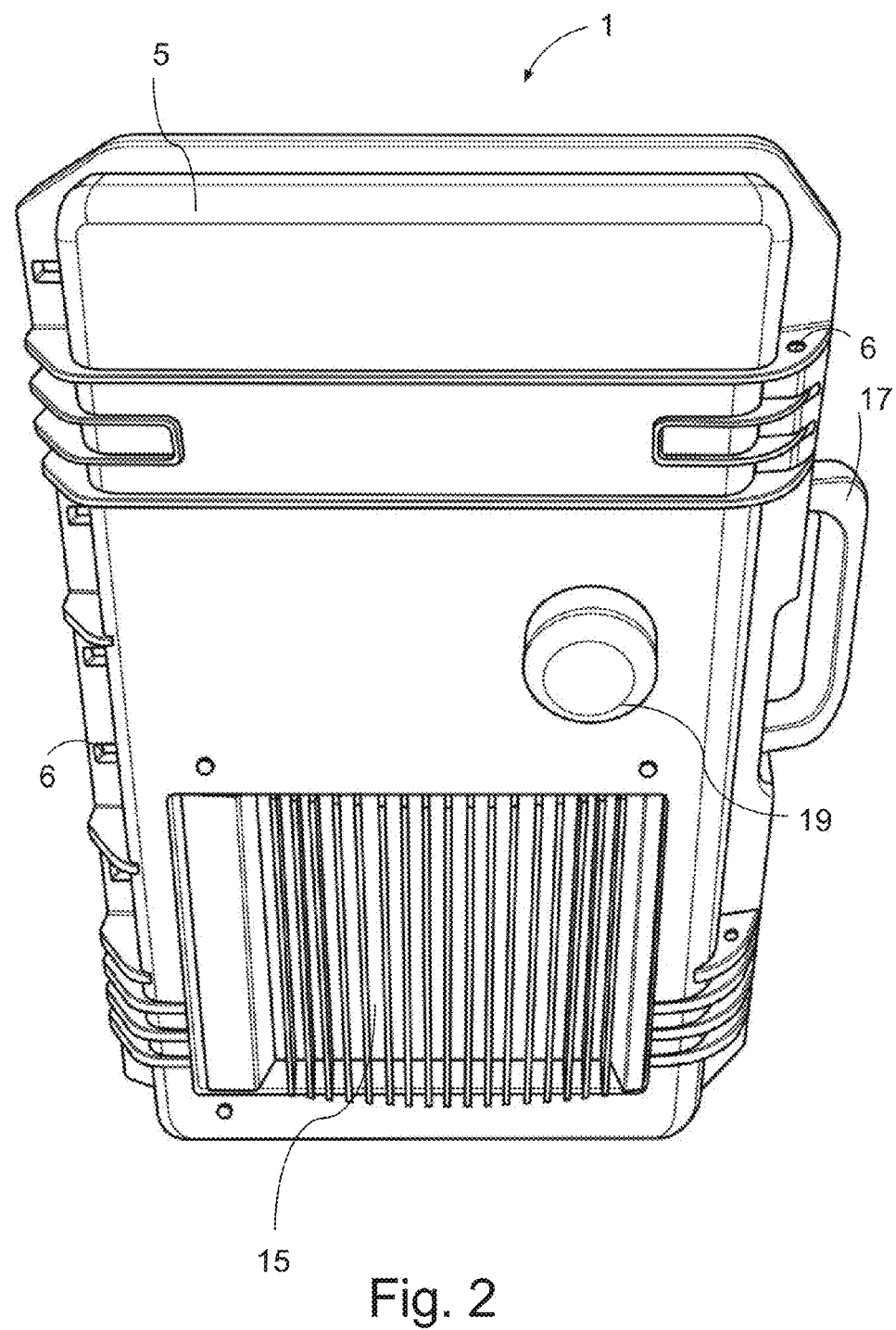
FIG. 2 is another elevated view of the rugged case containing a mobile media server according to FIG. 1.
Figure 3:
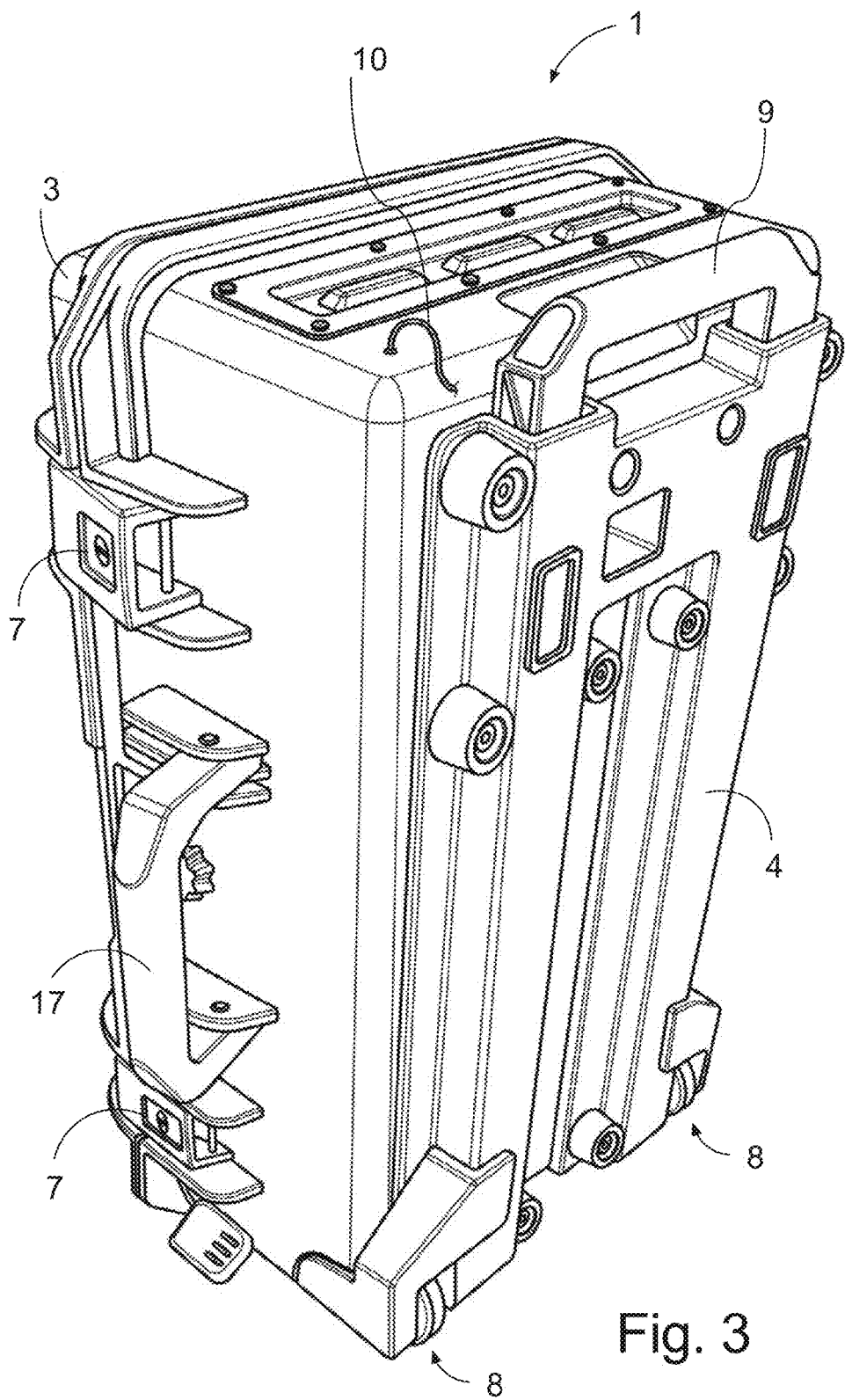
FIG. 3 is another elevated view of the rugged case containing a mobile media server according to FIG. 1.

FIGS. 1 to 3 show a rugged and mobile case 1, which is in an embodiment a hardshell case (similar to a flight case—robust non-metal case, such as plastic) that comprises a lower half 4 with an upper half 5 hingeably attached to the lower half. The upper and lower half can be locked to one another by levers that are provided with locks 7 (can be numeric or conventional key operated locks). The rugged mobile case is provided with rollers 8 and with an extendable handle 9 and a side handle 17. The case 1 is provided with one or more ventilation openings (not shown) and some of the contents of the case 1, such as the antenna housing 19 of a GPS sensor and the cooling ribs 15 of a server and a power cable 10 can be seen from the outside. The power cable 10 allows connecting the rugged and mobile media server case 1 to a power source of the passenger vehicle in which the mobile rugged media server case 1 is stowed or placed. Otherwise, the rugged mobile media server case 1 is completely closed and there is no access to the interior of the case 1 without opening the case 1.

Figure 4:
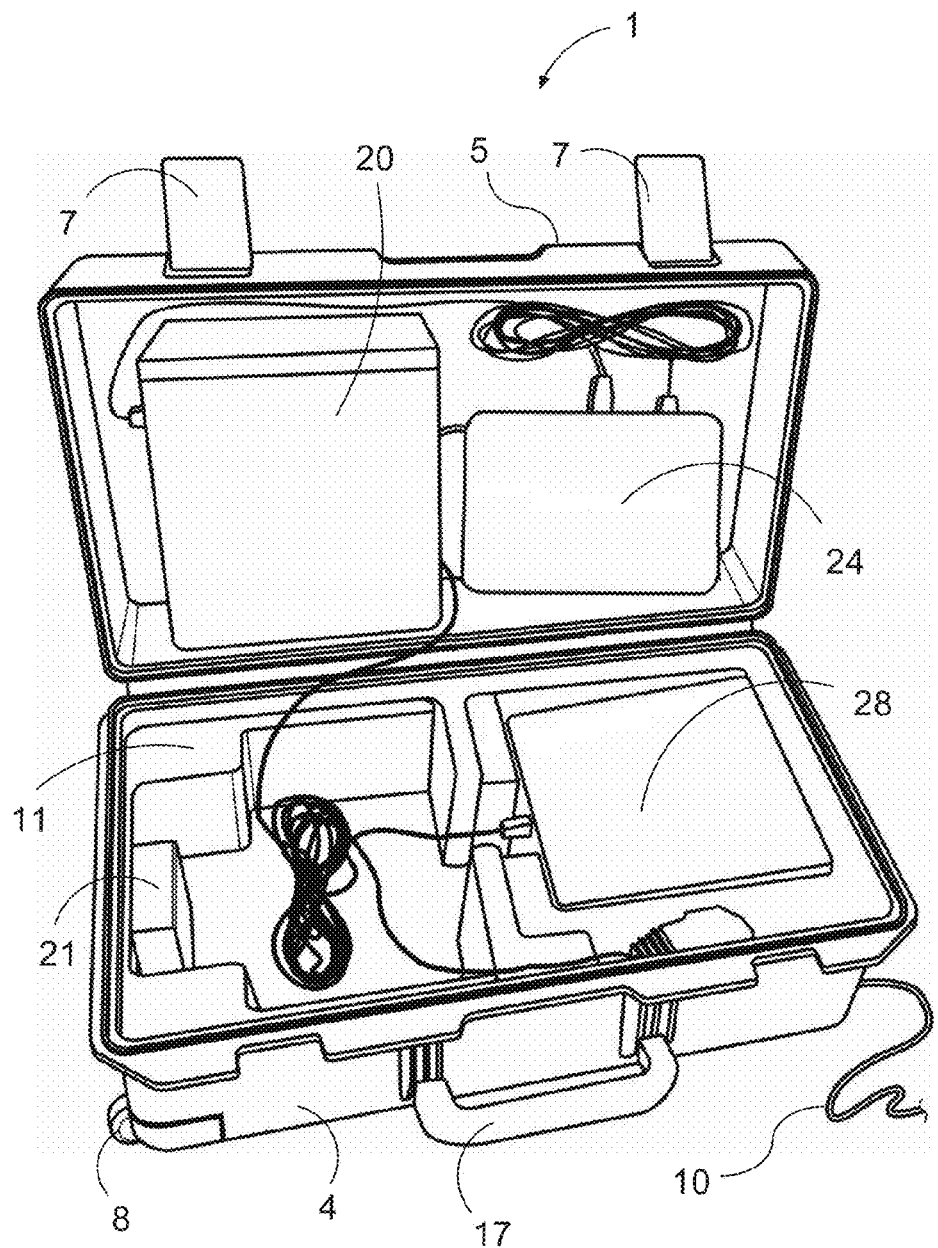
FIG. 4 is an elevated view of the interior of the rugged case according to FIG. 1.

FIG. 4 shows the interior of the case, which is lined with one or more soft and absorbent lining material elements 11 that protect the components of the media server. These lining material elements can be made from a plastic foam material or other suitable material for electronic devices during transport. The interior of the rugged case 1 also contains a server computer 20, a wireless access point 24 and a mobile data network modem 28. The wireless access point 24 and its antennas are optimized for passenger vehicles that have an oblong shape and metal structure that influences the wireless signal. In an embodiment the antennas (not shown) are located on the outside of the case 1. The server computer 20 can in an embodiment be a robust small server-pc with software allowing it to act as a media server. In an embodiment server has fanless cooling. Hereto, the media server 20 is provided with a side that is formed as a cooling surface 15 including a plurality of cooling ribs. In embodiment the cooling surface 15 side of the media server 20 is flush with one of the sidewalls of the mobile rugged case 1, enabled by an opening in the side wall of the case that corresponds in shape and size to the cooling surface 15. Thus, this cooling surface 15 has direct access to the air surrounding the case 1. In another embodiment, the cooling surface 15 is kept inside the case 1 and cooling is provided by a fan or other formal ventilator that ensures an airflow through the case through appropriate ventilation openings for inlet and outlet of cooling air. In embodiment the media server 20 is attached to the rugged case 1 with suspended bolts (not shown) to provide protection against shocks. The interior of the rugged case 1 also contains an uninterruptible power supply (UPS—not shown in FIG. 4) and a GPS receiver (not shown) that is connected to the aforementioned GPS antenna. The interior further includes a cooling fan 21 that is connected to the exterior of the case via ventilation openings and that provides for a flow of cooling air through the rugged case 1 in order to cool the electronic components. The interior of the rugged case 1 also contains the wiring connecting the electronic components to one another and to the power cord 10. When the rugged case 1 is closed the communication with the media server inside the rugged case 1 is only possible via wireless network and the power cable 10. The mobile media server extender case 4 is also provided with holes 6 for allowing the mobile media server case to be secured to the passenger vehicle in which it is stowed for preventing theft.

Figure 5:
FIG. 5 illustrates the transport of the rugged case containing a mobile media server according to FIG. 1.
Figure 6:
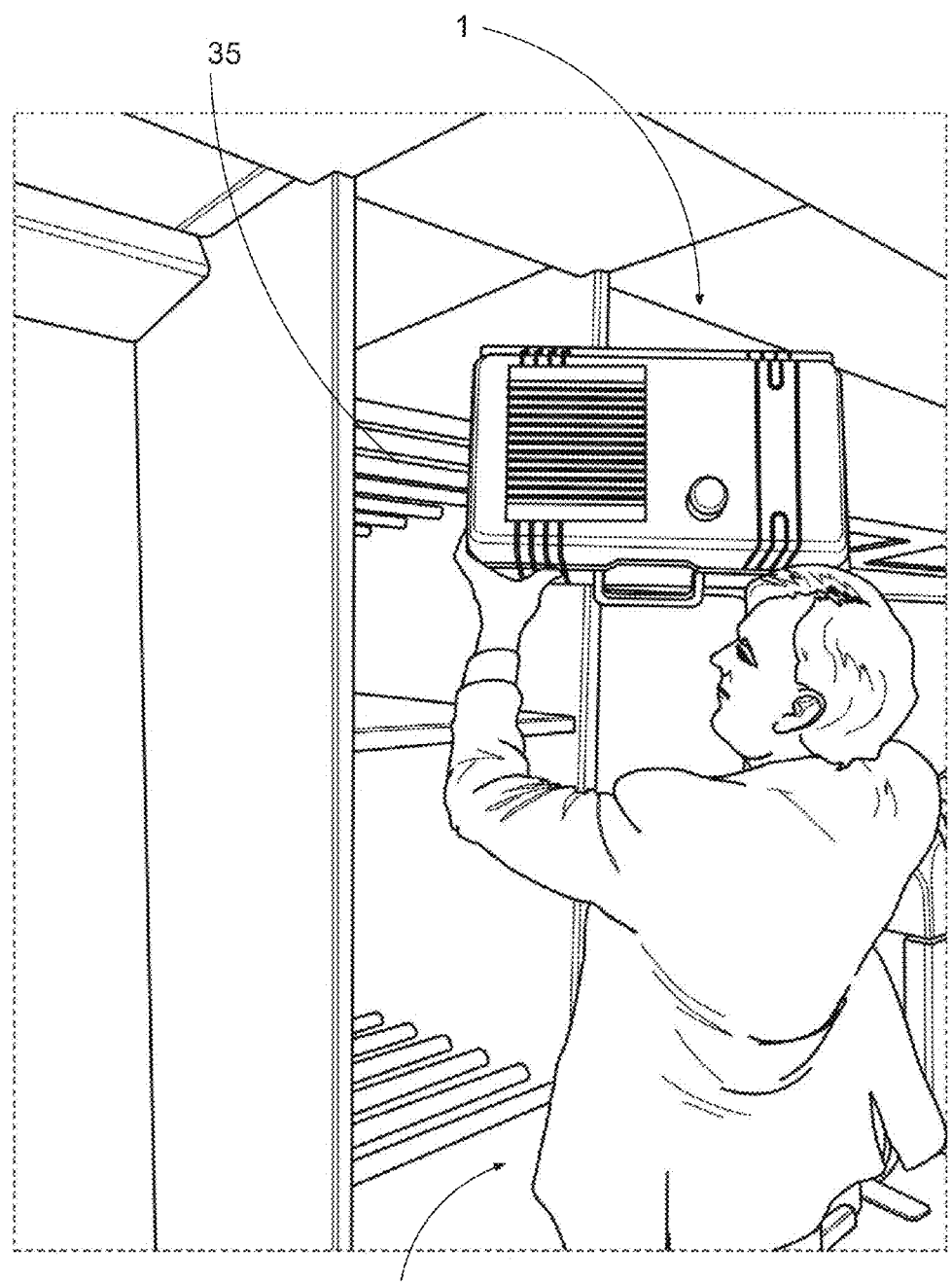
FIG. 6 illustrates stowing the rugged case containing a mobile media server according to FIG. 1.
Figure 7:
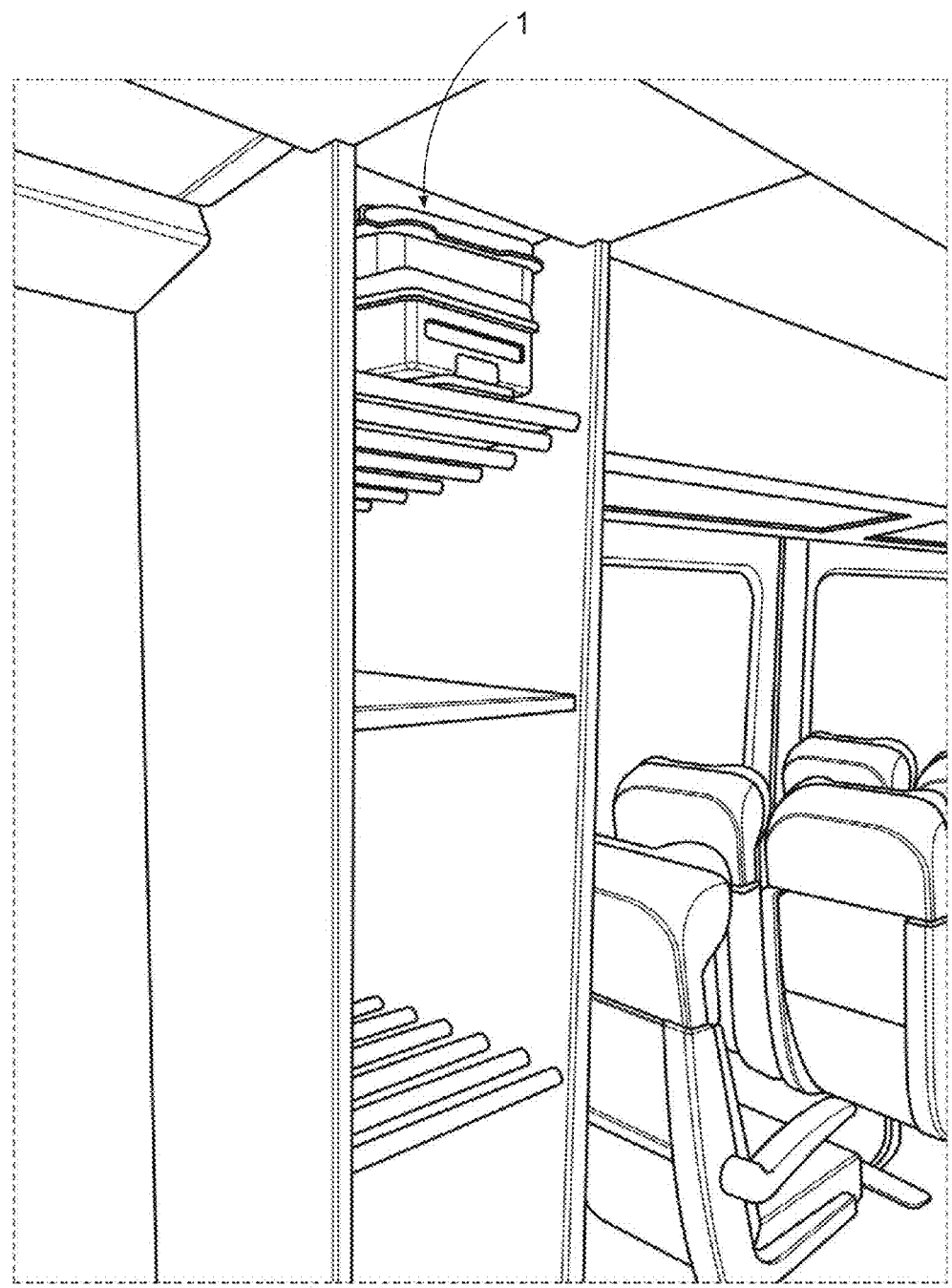
FIG. 7 illustrates a stowed rugged case containing a mobile media server according to FIG. 1.

FIG. 5 illustrates how the rugged case containing the media server can be transported with a single hand by an operator, such as an employee 33 of the public transport company, e.g. a railroad company, a shipping company, a bus company or an airline. In FIG. 5 the illustrated example is a passenger train, and shows an employee of the railroad company dragging the mobile rugged media server 1 along a platform next to a train. FIG. 6 illustrates how the rugged mobile media server case 1 can be stowed by an operator 33 into a luggage rack 35 or dedicated slot (not shown) in a passenger train compartment. The rugged mobile media server case 1 can in an embodiment be secured to the luggage rack or secured to the dedicated slot. It is though understood that the luggage rack could just as well be part of a bus, airplane or a passenger ship. FIG. 7 illustrates how the rugged mobile media server 1 is stowed in a luggage rack 35 of a passenger train compartment.

Figure 8A:
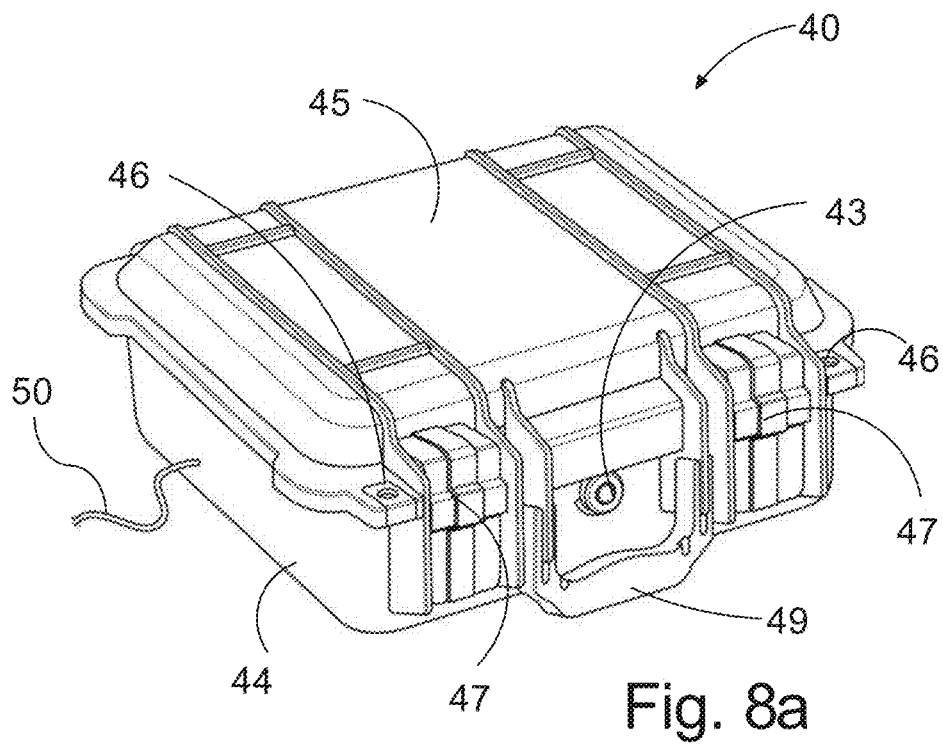
FIGS. 8a, 8b and 9 are elevated views of a rugged case containing a range extender associated with the media server according to an example embodiment.
Figure 8B:
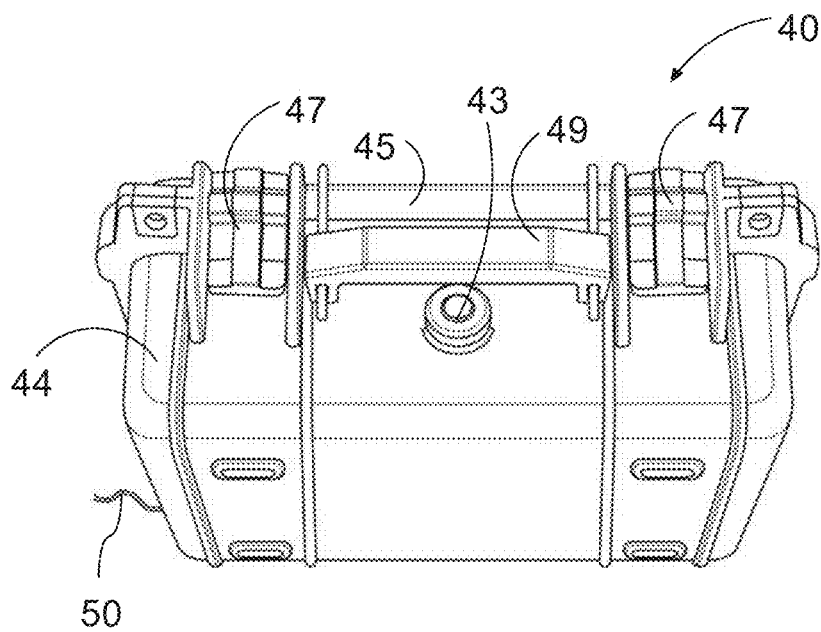

FIGS. 8a and 8b illustrate a rugged mobile range extender case 40. The case is a hardshell case that comprises a lower half 44 with a upper half 45 attached thereto. The case includes a handle 49 for carrying the case, a seal 43 and locks 47 for locking the case for preventing access by unauthorized persons. The range extender case 40 is also provided with holes 46 for locking the case and/or for allowing the range extender case to be secured to the passenger vehicle in which it is stowed for preventing theft. The rugged mobile range extender case 40 is also provided with a power cable 5 for connecting the range extender case to a power source of the passenger vehicle in which the mobile range extender case is stowed or placed.

Figure 9:
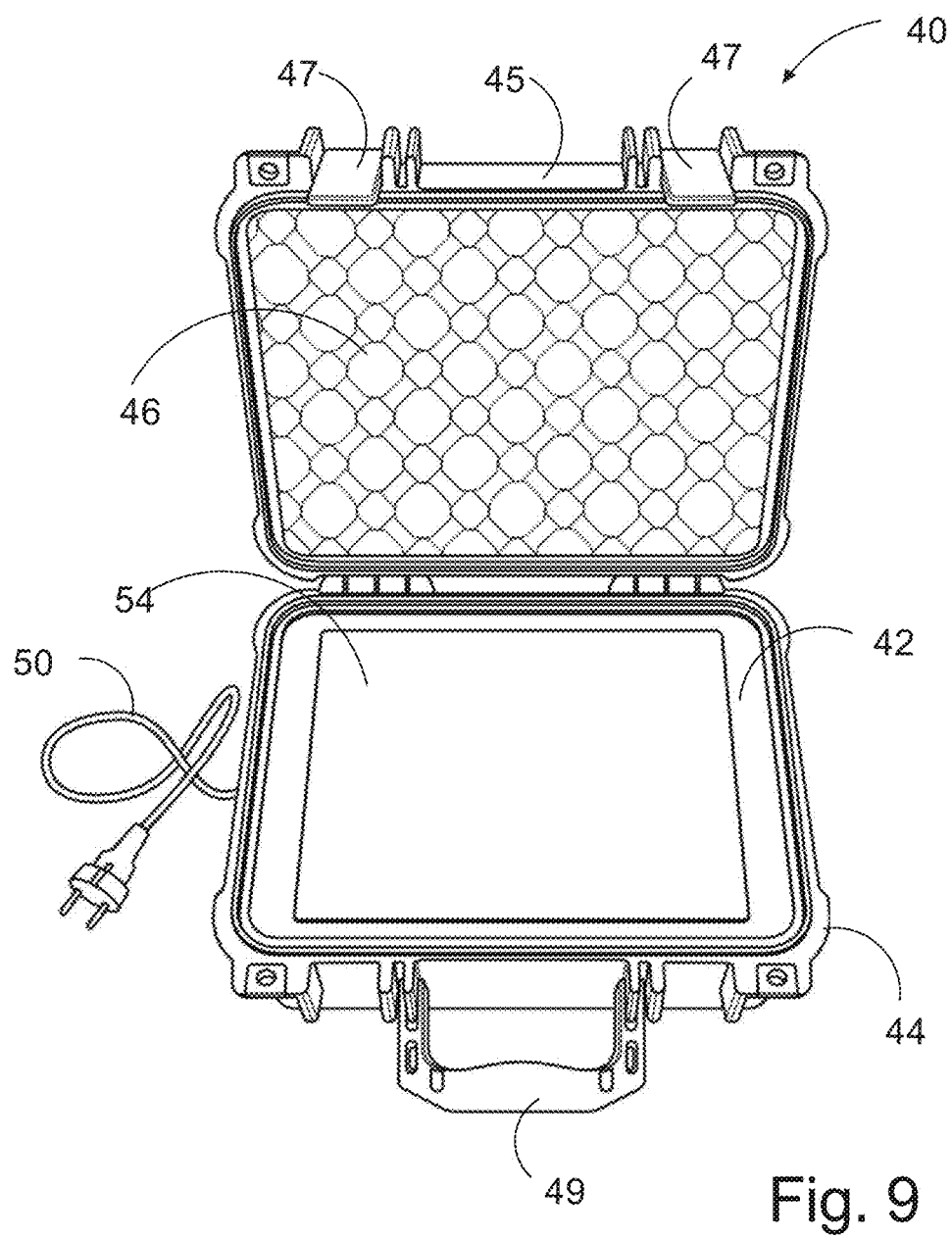

FIG. 9 shows the interior of the rugged mobile range extender case 40. The interior is aligned with a soft and absorbing material for protecting the electronic components that are housed inside the case 40. Suitable soft and absorbing materials for protecting electronic components or devices during transport or plastic foams, but other suitable materials are well known in the art. A range extender wireless network access point 54 is snugly received inside a block of soft and absorbing material 42 for protecting the range extender wireless network unit 54. In an embodiment a UPS (not shown) is also contained in the case 40 and connected to the range extender access point 54. The wireless network unit 54 (directly or via the UPS) is connected to the power cable 50. When the case 40 is closed the only connection with the wireless network unit 54 is via wireless network and the power cable 50.

Figure 10:
FIG. 10 illustrates the transport of a rugged case and a range extender.
Figure 11:
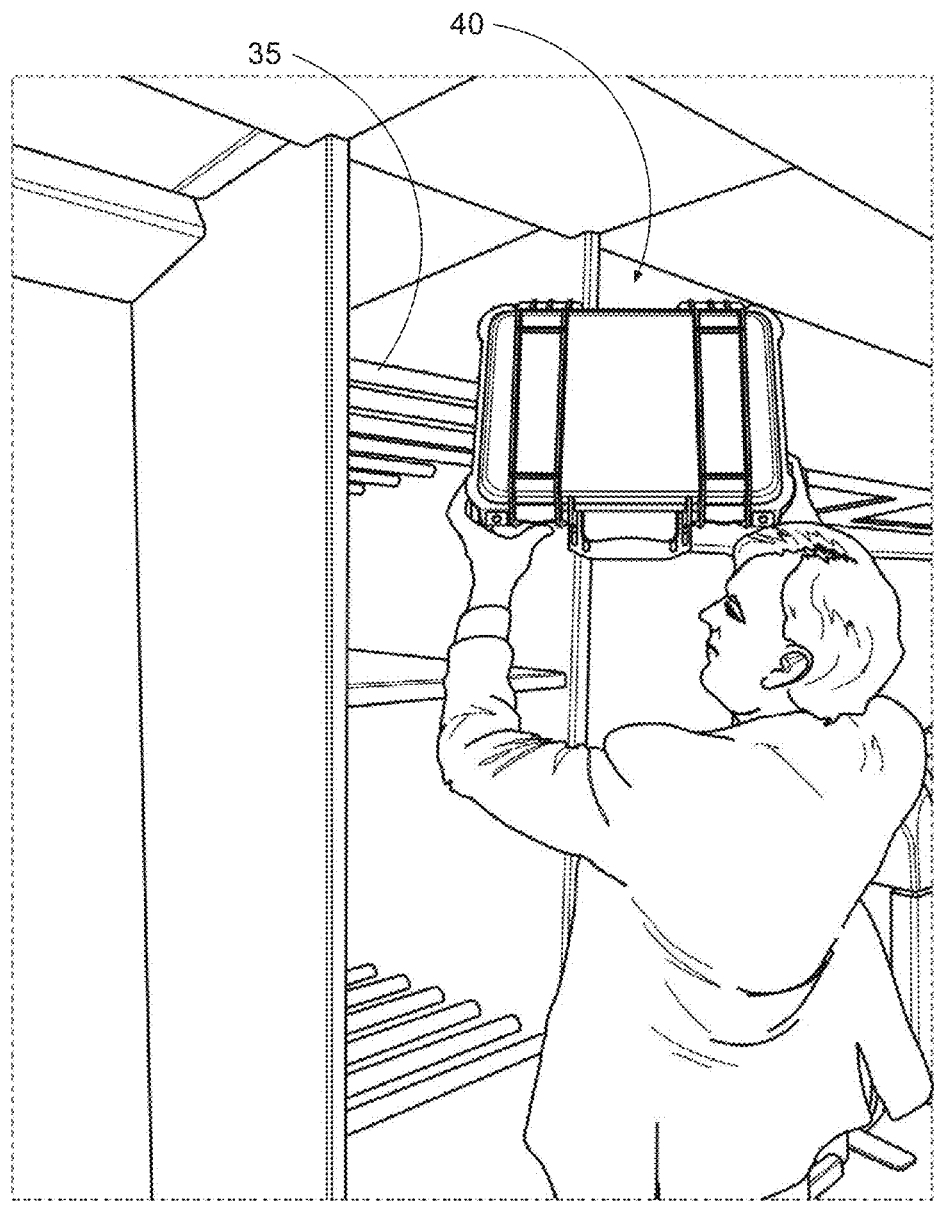
FIG. 11 illustrates stowing the range extender case according to FIGS. 8a, 8b and 9.
Figure 12:
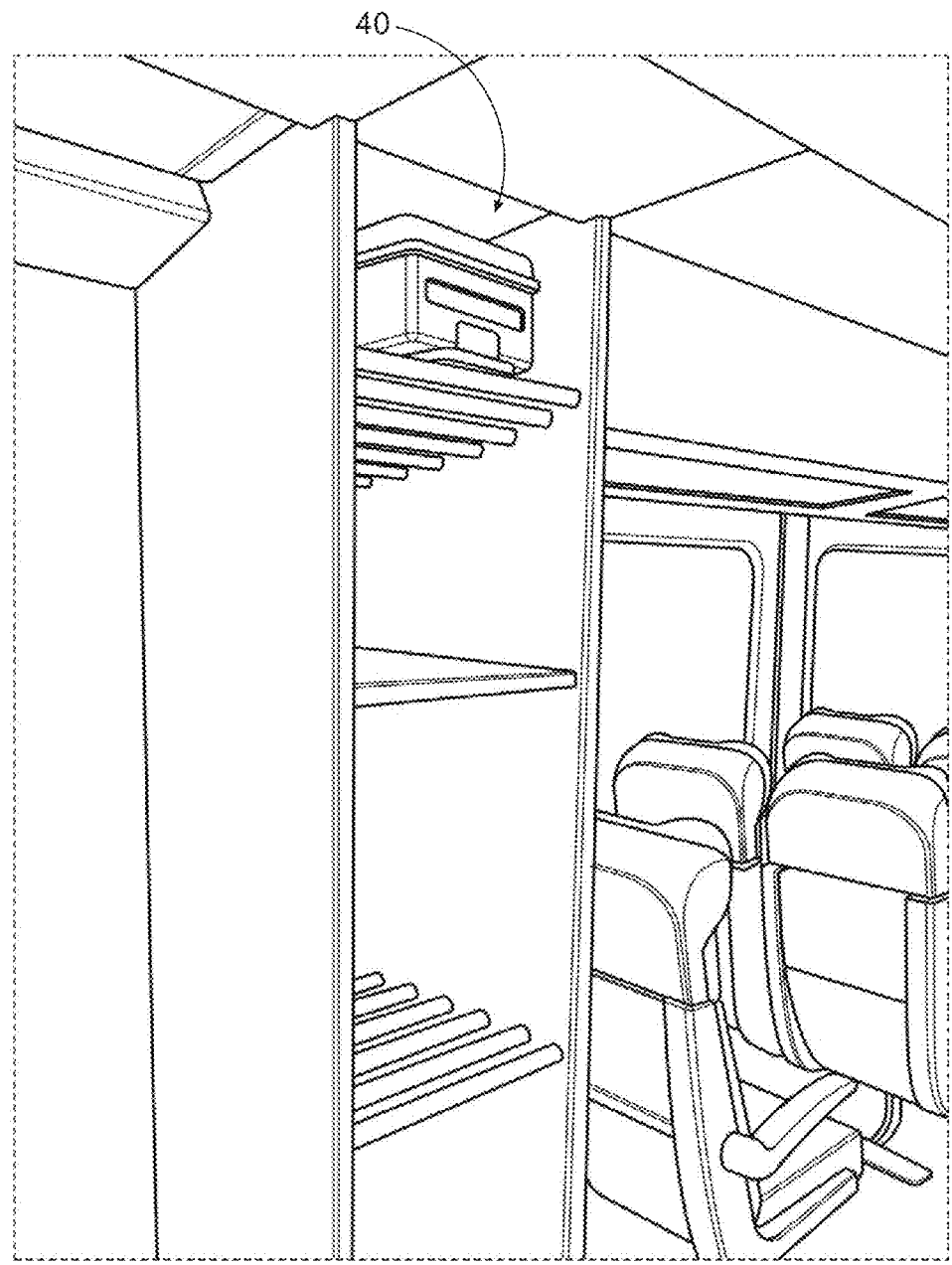
FIG. 12 illustrates a stowed rugged case containing a range extender according to FIGS. 8a, 8b and 9.

FIG. 10 illustrates how the rugged case 1 containing the media server and the range extender case 40 can be transported together with a single hand by an operator 33. FIG. 11 illustrates how the rugged range extender case 40 can be stowed by an operator 33 into a luggage rack 35 in a passenger train compartment. It is though understood that the luggage rack could just as well be part of a bus, airplane or a passenger ship. FIG. 12 illustrates how the rugged mobile range extender case 1 is stowed in a luggage rack of a passenger train compartment.

Figure 13:
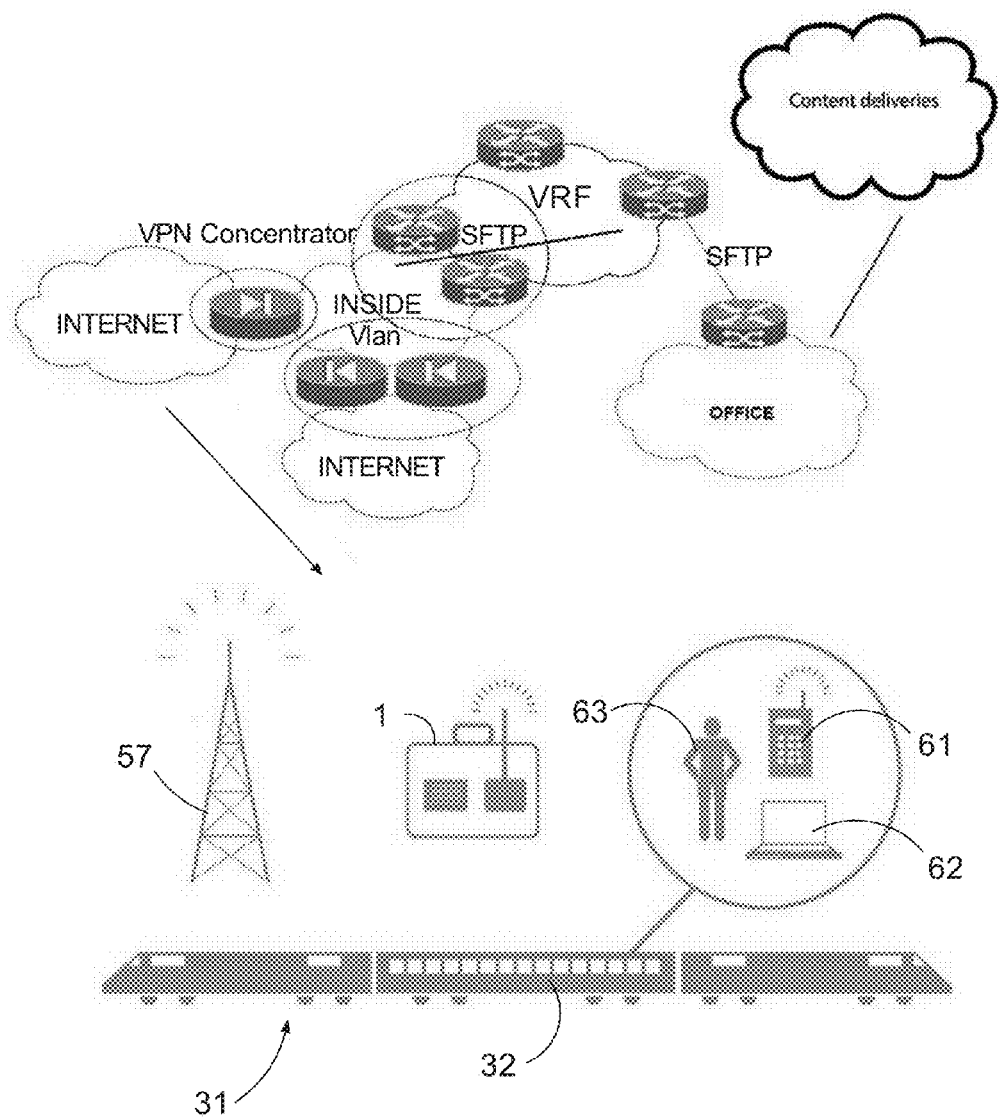
FIG. 13 is a system diagram illustrating an example embodiment of the mobile media server and its environment.

FIG. 13 shows an overview diagram of an example embodiment of a system including a rugged mobile media server for providing media content to passengers of a public transport vehicle. The rugged mobile case 1 contains a media content server 20, a mobile data modem 28 and WIFI router/access point 24. The coverage of the wireless network provided by the mobile rugged media server case 1 is typically a radius of approximately 80 m, corresponding approximately to one trainset 32 of a passenger train 30. The media server 20 downloads content etc. from a central server that can for example be located in an office of a media content provider company that in turn receives content deliveries from media providers, such as music and film companies. In an embodiment all the content is downloaded onto the media server 20 before the case 1 is placed in the passenger vehicle—this can for example be done in an office of the passenger transport company using a fast data connection. During stowage in the passenger vehicle, the media server 20 may fetch updates and communicate with servers for news and digital rights management, but the limited capacity of the mobile data modem is not used for fetching new content. Passengers 63 in the trainset 32 search and log on to the WIFI network via their own terminals, such as mobile phones or tablets 61 laptops 62 or that is provided by the wireless network access point 24 (with or without using the range) and gets access to the entertainment portal that is provided by the media server 20. The user/passenger may want to access a payment service for paying for payable content and the system uses its own mobile network connection to validate payments and DRM for content. For the data communication associated with news (train/planes schedules, delays, changes and general news), DRM, payment and so on the media server 20 communicates with the internet via the mobile network modem 28 that is linked via an RF link to a base station 57 of a mobile data network.

Figure 14:
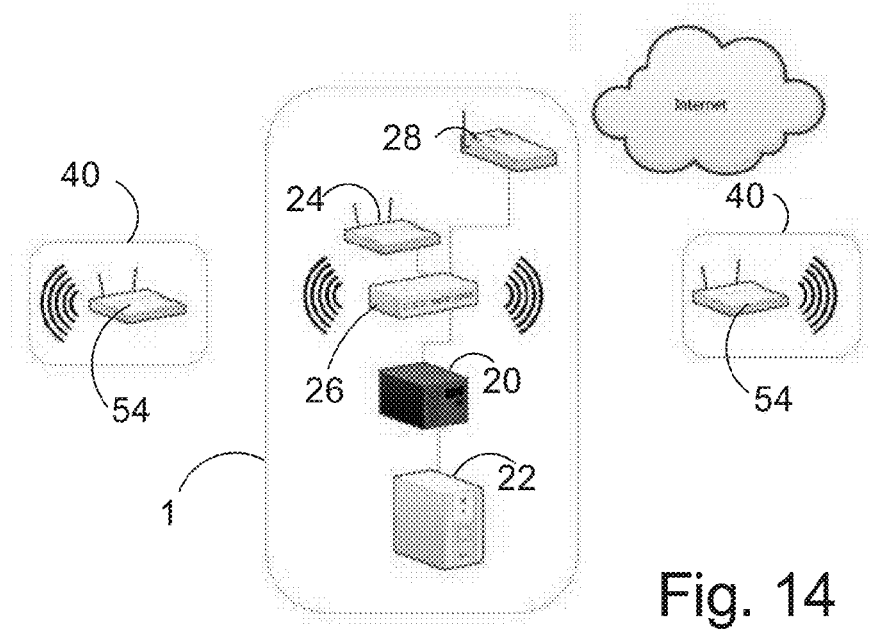
FIG. 14 is a hardware overview diagram of an example embodiment of the mobile media server.

FIG. 14 illustrates the hardware of the system. The media server 20 contains all files/software for the system. An uninterruptible power supply 22 (UPS) is connected to the media server 20 to ensure maximum stability of the system. A wireless controller 26 connects the wireless access point 24 and the mobile data modem 28 to the media server 20. The wireless access point 24 sends bi-directional signals, covers a span of 40 approximately meters. The mobile data modem 28 connects to the internet for updates, news, payment portal data and DRM system data. The wireless access range extenders 54 transmit unidirectional signals, cover a span of approximately 20 meters and communicate with the media server 20 wirelessly on a separate channel.

Figure 15:
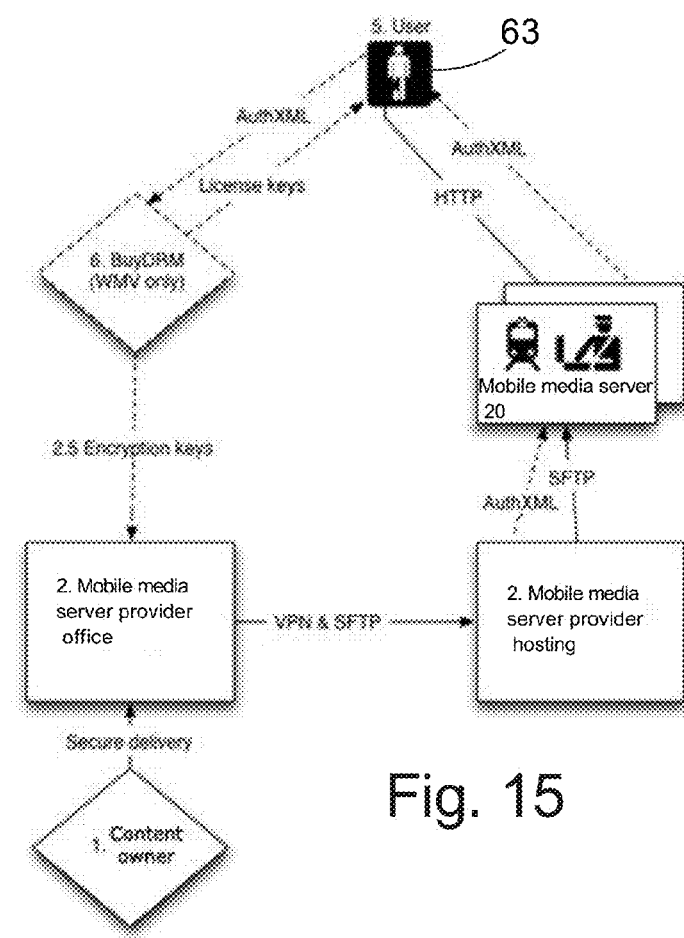
FIG. 15 is a diagram illustrating an example embodiment of a DRM system associated with the media server.

FIG. 15 illustrates an integrated digital rights management (DRM) system that is integrated in the mobile media server 20. The DRM is approved by the major movie studios and it enables the media server to feature Hollywood blockbusters in the system. The media are provided by the content owner to a mobile media server provider who receives this content at their office. The mobile media service provider company provides for mobile media hosting using VPN and SFTP. The mobile media server 20 in the train or other similar passenger vehicle receives the content via SFTP and receives the authentication XML files from the hosting service. The mobile media server communicates the authentication XML files via HTTP to the terminal 61, 62 of the user 63. The user 63 can then buy DRM rights and receive the license keys that enable playing the content on his own terminal 61, 62. The Encryption keys are sent back to the mobile media server provider.

Thus, the Figs. illustrate a media server for use in a public transportation vehicle. The media server includes a protective and mobile case 1 that forms a housing with an interior space. The interior space contains a computer 20 with a memory having a library of digital media stored thereon. The interior also houses wireless network access point 24 connected to the computer 20. The wireless access point is configured to establish a local wireless network on board the public transportation vehicle. The computer 20 comprises a processor configured for providing a media service for offering passengers on board the public transportation vehicle 30, 32 access to media stored in the library via the wireless network.

Thus, the rugged and mobile media server 1 is a self-contained unit without any physical user interface components, such as keys, buttons or a display. The computer 20 is a self-contained unit with a power cord with a power plug for connection to a wall socket or similar power source of the public transportation vehicle as the only physical interface with its surroundings. The wireless access point 24 is configured for coverage of the public transportation vehicle 32 such as a bus, a train, a ship or an airplane, possibly supported by independent range extender wireless network units 40 when the rugged and mobile media server 1 is used in very long vehicles.

In an embodiment the processor is configured to automatically start-up the media service when the computer 20 is powered up. The processor may also be configured for allowing any terminal device with a suitable wireless network communication functionality that is on board the public transport vehicle 31 to access media stored in the library. In an embodiment the computer 20 has a passive cooling system, preferably including a cooling area of an outside wall of the computer. In an embodiment the protective mobile case 1 can be opened and closed and is provided with at least one lock 7 for preventing unauthorized persons from opening the protective mobile case 1. In an embodiment the protective mobile case 1 is provided with a lock or attachment arrangement 6 for securing the protective mobile case to the structure of the public transportation vehicle. In an embodiment the protective mobile case is not provided with any user interface. In an embodiment user interaction with the closed and/or locked case is exclusively via the wireless network. In an embodiment the protective and mobile case 1 is provided with a fan 21 that is connected to a ventilation opening in an outer wall of the case 1 for forced cooling of the devices 20, 24, 28 inside the case 1. In an embodiment the protective and mobile case 1 also further comprises a mobile phone- or mobile data network modem 28 connected to the computer 20 and/or to the wireless network access point 24. In an embodiment the processor is configured to attempt to- and update any software installed on the computer 20 and any media content for the library whenever the mobile data network modem 28 is connected to a mobile data network. In an embodiment the protective mobile case 1 includes a GPS receiver connected to the computer and a GPS antenna 19 attached to the protective mobile case or in the case 1 and connected to the GPS receiver. In an embodiment the rugged and mobile media server includes one or more independent range extenders 54, each extender 54 being housed in a separate protective and mobile range extender case 40. In an embodiment the range extender case 40 and the mobile protective case 1 are configured to be attachable to one another so as to allow a single operator 33 to transport the combination of a protective mobile case 1 and a range extender case 40 with one hand. The user interface for selection of media content can be a browser or webportal or a native app running on the passenger's wireless network enabled media playing capable terminal device 61, 62, such as a mobile phone, tablet or laptop computer. In an embodiment the media portal contains a welcome page with an explanation of the portal and its operation. In an embodiment the media library comprises movies and/or music and/or audiobooks and/or games. In an embodiment the media library content is fully stored on the portal server. In an embodiment the media server 20 offers both content that is free and content which is subject to a fee. In an embodiment the media server 20 offers content that can be played as streaming on demand, download-to-own or as part of a subscription package. In an embodiment the media server 20 offers travel information via the portal, such as allowing a passenger to be able to call up: information concerning the punctuality and connections of his/her current public transport vehicle, stations or stopover maps, detailed description on the services in the public transport vehicle. In an embodiment the method media server 20 automatically updating software and/or library when the mobile phone- or mobile data network modem has connection to a mobile phone- or mobile data network.

In an embodiment the passengers are offered internet access via the system associated with the media sever.

In an embodiment, off-line or cloud access is provided after leaving the passenger vehicle for media content that passengers accessed, bought or rented while on board the public transport vehicle.

Although the teaching of this application has been described in detail for purpose of illustration, it is understood that such detail is solely for that purpose, and variations can be made therein by those skilled in the art without departing from the scope of the teaching of this application. The term "comprising" as used in the claims does not exclude other elements or steps. The term "a" or "an" as used in the claims does not exclude a plurality. The single processor or other unit may fulfill the functions of several means recited in the claims.

The invention claimed is:

1. A rugged, portable and self-contained media server for use with mobile devices in a public transportation vehicle, said rugged and mobile media server being a self-contained unit without any physical user interface components, said media server comprising:
   a carry-on, portable, rugged, protective, open and closable mobile case that forms a housing defining an interior space, said housing providing access to said interior space only when said housing is open and said housing does not provide access to said interior space without opening said case,
   said interior space containing a computer, said computer having a memory having a library of digital media stored thereon, said computer operational in a closed state of the case,
   a wireless network access point disposed within the interior space connected to said computer and a mobile data network modem disposed within the interior space and connected to said computer or to said wireless network access point,
   said mobile data network modem being configured to link to a base station of said mobile data network via an RF link,
   said wireless network access point being configured to establish a local wireless network within a confine of the public transportation vehicle only with the mobile devices on board said public transportation vehicle,
   said computer comprising a processor configured to automatically update a content of said library of digital media when the mobile data network modem has connection to a mobile data network, and
   said processor is further configured for providing a media service to passengers with mobile devices on board said public transportation vehicle over the local wireless network established by the wireless network access point, the media service comprising access to media content stored in said library of digital media of the mobile media server via said local wireless network on board said public transportation vehicle said processor being configured to:
   detect a wireless connection between one or more mobile devices of passengers and the media server over the local wireless network;
   enable an application on each individual mobile device of the one or more mobile devices as a user interface on each individual mobile device for the selection of media content from the library of digital media of the mobile media server when the case is in the closed state; and
   allow said passengers with the application enabled mobile devices on board said public transportation vehicle to select digital media from said library of media of the mobile media server for streaming to the individual mobile device via said local wireless network while on-board the public transportation vehicle; and
   wherein said processor is configured to stream the selected digital media to a selecting mobile device via said local wireless network.

2. A rugged and mobile media server according to claim 1, wherein said rugged and mobile media server is a self-contained unit with a power cord with a power plug for connection to a wall socket of said public transportation vehicle as an only external physical interface with its surroundings.

3. A rugged and mobile media server according to claim 1, wherein said wireless access point is configured for coverage only within said public transportation vehicle such as a bus, a train or an airplane, supported by an independent range extender wireless network unit disposed within the liner of the interior space, when said rugged and mobile media server is used in very long vehicles.

4. A rugged and mobile media server according to claim 1, wherein said processor is configured to automatically start-up said media service when said computer is powered up.

5. A rugged and mobile media server according to claim 1, wherein said processor is configured for allowing any terminal device with a suitable wireless network communication functionality that is on board said public transport vehicle to access media stored in said library.

6. A rugged and mobile media server according to claim 1, wherein said computer has a passive cooling system, preferably with a forced cooling being provided by a fan inside the mobile case.

7. A rugged and mobile media server according to claim 1, wherein said protective mobile case further comprises a GPS receiver connected to said computer and a GPS antenna integrated in said mobile case and connected to said GPS receiver.

8. A rugged and mobile media server according to claim 1, further comprising one or more independent range extenders, each extender being housed in a separate protective and mobile range extender case.

9. A rugged and mobile media server according to claim 1, further comprising using a fully integrated DRM system.

10. A rugged and mobile media server according to claim 1, wherein a cooling surface of an outside wall of the computer is substantially flush with a sidewall of the case.

11. A rugged and mobile media server according to claim 10, wherein an opening is defined in the sidewall of the case that corresponds in shape and size to the cooling surface of the outside wall of the computer, and the cooling surface of the computer has direct access to air surrounding the case through the opening.

12. A rugged and mobile media server according to claim 8, wherein each range extender is configured to transmit unidirectional signals for a span of approximately 20 meters and communicate with the media server on a separate channel.

* * * * *